United States Patent
Kuhl et al.

(10) Patent No.: US 11,578,200 B2
(45) Date of Patent: Feb. 14, 2023

(54) OXYGEN-TIGHT FOOD CONTAINER

(71) Applicants: Norbert Kuhl, Erlstätt (DE); Martin Wassmer, Caux (CH)

(72) Inventors: Norbert Kuhl, Erlstätt (DE); Martin Wassmer, Caux (CH)

( * ) Notice: Subject to any disclaimer, the term of this patent is extended or adjusted under 35 U.S.C. 154(b) by 0 days.

(21) Appl. No.: 16/071,559

(22) PCT Filed: Dec. 16, 2016

(86) PCT No.: PCT/EP2016/081458
§ 371 (c)(1),
(2) Date: Jul. 20, 2018

(87) PCT Pub. No.: WO2017/133820
PCT Pub. Date: Aug. 10, 2017

(65) Prior Publication Data
US 2019/0016528 A1    Jan. 17, 2019

(30) Foreign Application Priority Data

Feb. 1, 2016   (DE) .......................... 102016201498.6

(51) Int. Cl.
*C08L 29/04*      (2006.01)
*B32B 3/06*       (2006.01)
(Continued)

(52) U.S. Cl.
CPC ............. *C08L 29/04* (2013.01); *B29C 45/47* (2013.01); *B29C 45/581* (2013.01); *B29C 45/60* (2013.01);
(Continued)

(58) Field of Classification Search
CPC .... C08L 29/04; C08L 3/02; C08L 3/04; C08L 3/08; C08L 1/12; C08L 1/30; C08L 67/04;
(Continued)

(56) References Cited

U.S. PATENT DOCUMENTS 4,261,473 A   4/1981   Yamada et al.
4,427,825 A   1/1984   Degrassi et al.
(Continued)

FOREIGN PATENT DOCUMENTS

CN   1105333 A   7/1995
CN   1430627 A   7/2003
(Continued)

OTHER PUBLICATIONS

Lee et al., Polylactic Acid: A Practical Guide for the Processing, Manufacturing, and Applications of PLA, William Andrew, pp. 53-54. (Year: 2019).*

(Continued)

*Primary Examiner* — Lee E Sanderson (57) ABSTRACT

The invention relates to a food packaging unit (20) comprising a food container (1) for receiving a liquid, pasty or free-flowing food. The injection-moulded, single-component, cup-shaped base body (2) of the food container surrounds, with a wall (5), a bottom (6) and an outwardly projecting collar (7), an opening (4) which is closed by a food-container-covering film (10) applied to the collar (7). The food container (1) is injection-moulded in a single layer from a polymer blend comprising two components, a first component of which being PVOH or a PVOH copolymer. The food-container-covering film (10), which can be applied to the plastic food container (1) in order to close the opening (4) by sealing, welding or adhesion, comprises a cellulose-containing layer which is coated with PVOH, or a PVOH polymer blend layer.

21 Claims, 2 Drawing Sheets

(51) Int. Cl.

| | | |
|---|---|---|
| *B32B 27/32* | (2006.01) | |
| *B32B 7/12* | (2006.01) | |
| *B32B 27/10* | (2006.01) | |
| *B32B 15/20* | (2006.01) | |
| *B32B 27/08* | (2006.01) | |
| *B65D 73/00* | (2006.01) | |
| *B32B 15/082* | (2006.01) | |
| *B32B 3/04* | (2006.01) | |
| *B32B 27/30* | (2006.01) | |
| *B32B 9/02* | (2006.01) | |
| *B32B 15/08* | (2006.01) | |
| *B65D 85/804* | (2006.01) | |
| *B65D 65/46* | (2006.01) | |
| *C08L 23/06* | (2006.01) | |
| *C08L 23/12* | (2006.01) | |
| *C08L 25/06* | (2006.01) | |
| *C08L 77/00* | (2006.01) | |
| *B29C 45/47* | (2006.01) | |
| *B29C 45/58* | (2006.01) | |
| *B29C 45/60* | (2006.01) | |
| *C08L 23/08* | (2006.01) | |
| *C08L 23/14* | (2006.01) | |
| *B65D 65/40* | (2006.01) | |
| *B29L 31/00* | (2006.01) | |

(52) U.S. Cl.
CPC .................. *B32B 3/04* (2013.01); *B32B 3/06* (2013.01); *B32B 7/12* (2013.01); *B32B 9/02* (2013.01); *B32B 15/08* (2013.01); *B32B 15/082* (2013.01); *B32B 15/20* (2013.01); *B32B 27/08* (2013.01); *B32B 27/10* (2013.01); *B32B 27/306* (2013.01); *B32B 27/32* (2013.01); *B65D 65/466* (2013.01); *B65D 73/00* (2013.01); *B65D 85/8043* (2013.01); *C08L 23/06* (2013.01); *C08L 23/08* (2013.01); *C08L 23/12* (2013.01); *C08L 23/14* (2013.01); *C08L 25/06* (2013.01); *C08L 77/00* (2013.01); *B29L 2031/72* (2013.01); *B32B 2250/03* (2013.01); *B32B 2250/04* (2013.01); *B32B 2255/10* (2013.01); *B32B 2255/24* (2013.01); *B32B 2270/00* (2013.01); *B32B 2307/72* (2013.01); *B32B 2307/7242* (2013.01); *B32B 2307/7246* (2013.01); *B32B 2307/7248* (2013.01); *B32B 2307/7265* (2013.01); *B32B 2307/732* (2013.01); *B32B 2439/00* (2013.01); *B65D 65/40* (2013.01); *C08L 2201/06* (2013.01); *C08L 2201/14* (2013.01)

(58) Field of Classification Search
CPC .......... C08L 23/06; C08L 23/08; C08L 23/12; C08L 23/14; B32B 2439/40; B32B 2439/70; B32B 2439/80; B65D 11/20; B65D 85/804; B65D 85/8043; B65D 85/8046; B65D 2215/02; B65D 2215/04; B65D 65/46; B65D 85/80; A47J 31/407; A61J 1/03; B08L 67/04
USPC .............. 428/36.5, 35.7; 99/295; 426/77, 80
See application file for complete search history.

(56) References Cited

U.S. PATENT DOCUMENTS

| | | |
|---|---|---|
| 4,600,746 A | 7/1986 | Schmukler et al. |
| 4,801,041 A * | 1/1989 | Takata .................... B29C 65/76 220/359.3 |
| 5,224,601 A | 7/1993 | Gouge et al. |
| 5,322,866 A | 6/1994 | Mayer et al. |
| 5,334,634 A * | 8/1994 | Bastiolo .................... C08L 3/02 524/47 |
| 5,349,000 A | 9/1994 | Robeson et al. |
| 5,378,414 A | 1/1995 | Derkach |
| 5,382,611 A * | 1/1995 | Stepto .................... C08B 30/12 524/47 |
| 5,384,170 A | 1/1995 | Bastioli et al. |
| 5,393,804 A * | 2/1995 | George .................... C08L 3/02 524/53 |
| 7,048,975 B1 | 5/2006 | Tojo et al. |
| 8,410,200 B2 | 4/2013 | Oakley et al. |
| 2002/0065363 A1* | 5/2002 | Wang .................... C08L 29/04 525/58 |
| 2002/0128384 A1 | 9/2002 | Wang et al. |
| 2005/0192403 A1* | 9/2005 | Nosker .................... C08L 69/00 525/63 |
| 2006/0173104 A1 | 8/2006 | Gatenholm et al. |
| 2006/0251841 A1 | 11/2006 | Yang et al. |
| 2010/0051861 A1 | 3/2010 | Inubushi et al. |
| 2010/0064899 A1* | 3/2010 | Aardenburg ....... B65D 85/8052 99/295 |
| 2010/0081737 A1* | 4/2010 | Bastioli .................... C08L 3/00 524/47 |
| 2011/0097528 A1* | 4/2011 | Dippel .................. B65D 1/0215 428/36.6 |
| 2011/0126497 A1* | 6/2011 | Bauer .................... B32B 27/306 53/461 |
| 2011/0196071 A1* | 8/2011 | Mentink .................... A23G 4/08 524/51 |
| 2012/0138562 A1* | 6/2012 | Letica ................ B65D 43/0279 215/221 |
| 2012/0149844 A1* | 6/2012 | Whitehouse ............. C08J 3/005 525/58 |
| 2013/0045308 A1* | 2/2013 | Gorbatenko ....... B65D 85/8043 426/84 |
| 2013/0131224 A1 | 5/2013 | Bastioli et al. |
| 2014/0037916 A1* | 2/2014 | Reilly .................... B32B 27/10 428/200 |
| 2015/0232263 A1 | 8/2015 | Talon |
| 2015/0274413 A1 | 10/2015 | Brandt Sanz et al. |
| 2015/0336736 A1* | 11/2015 | Cabilli ............... B65D 85/8043 426/112 |
| 2017/0008694 A1* | 1/2017 | Andreae ............ B65D 65/466 |
| 2017/0037241 A1* | 2/2017 | Schmidt ............ B65D 85/8043 |
| 2017/0174417 A1* | 6/2017 | Nordqvist .......... B65D 85/8043 |
| 2021/0038726 A1* | 2/2021 | Magistrali ............... C08B 31/00 |

FOREIGN PATENT DOCUMENTS

| | | | |
|---|---|---|---|
| CN | 102717969 A | 10/2012 | |
| CN | 102977565 A | 3/2013 | |
| CN | 103044716 A * | 4/2013 | ......... B29C 48/0022 |
| CN | 104603027 A | 5/2015 | |
| DE | 68907387 T2 | 10/1993 | |
| DE | 691 18 000 T2 | 9/1996 | |
| DE | 19802718 A1 | 7/1999 | |
| DE | 102011052149 A1 | 1/2013 | |
| EP | 0157612 A2 | 10/1985 | |
| EP | 0441666 A2 | 8/1991 | |
| EP | 0584590 A1 | 3/1994 | |
| EP | 0603876 A1 | 6/1994 | |
| EP | 2 334 734 B1 | 9/2012 | |
| EP | 2937386 A1 | 10/2015 | |
| EP | 3604184 A1 * | 2/2020 | |
| GB | 2189789 A | 11/1987 | |
| JP | H0586250 A | 4/1993 | |
| JP | H05125266 A | 5/1993 | |
| JP | 2001049100 A | 2/2001 | |
| JP | 200172822 A | 3/2001 | |
| JP | 2003-026887 A | 1/2003 | |
| JP | 2005-015814 A | 1/2005 | |
| JP | 6263954 B2 | 1/2018 | |
| WO | WO-92/16583 A1 | 10/1992 | |
| WO | WO-93/20140 A1 | 10/1993 | |
| WO | WO-2002078455 A1 | 10/2002 | |
| WO | WO-2007/118280 A1 | 10/2007 | |

(56) References Cited

FOREIGN PATENT DOCUMENTS

| WO | WO-2009153275 | A1 | 12/2009 |
|---|---|---|---|
| WO | WO-2012124129 | A1 | 9/2012 |
| WO | WO-2013120997 | A1 | 8/2013 |
| WO | WO-2014067507 | A2 | 5/2014 |
| WO | WO-2014202694 | A1 | 12/2014 |
| WO | WO-2015/082982 | A1 | 6/2015 |
| WO | WO-201 5158838 | A1 | 10/2015 |
| WO | WO-2015177591 | A2 | 11/2015 |

OTHER PUBLICATIONS

Rudnick, Ewa, Compostable Polymer Materials, Elsevier, 2008, p. 24. (Year: 2008).*
Ph.D. thesis of Onanong Cheerarot available online at https://www.research.manchester.ac.uk/portal/files/54527179/FULL_TEXT.PDF, pp. 80-85. (Year: 2012).*
Huneault et al., Preparation and Properties of Extruded Thermoplastic Starch/Polymer Blends published in the Journal of Applied Polymer Science in Mar. 2012. (Year: 2012).*
Rosato et al., Injection Molding Handbook, 3rd Ed. Kluwer Academic Publishers, Norwell, MA 2000 (Year: 2000).*
The Polymer Properties Database accessed online at https://polymerdatabase.com/Polymer%20Brands/PBS.html on Jan. 19, 2021 (Year: 2021).*
Cecchi et al., Biobased Products from Food Sector Waste, Springer, 2021 (Year: 2021).*
Cano et al., Physical and microstructural properties of biodegradable films based on starch and PVA, Journal of Food Engineering, 167 (2015) 59-64 (Year: 2015).*
International Search Report for International Application No. PCT/EP2016/081458, dated Mar. 27, 2017.
Written Opinion of the International Searching Authority for International Application No. PCT/EP2016/081458, dated Mar. 27, 2017.
International Search Report for International Application No. PCT/EP2017/052137, dated Mar. 27, 2017.
Written Opinion for International Application No. PCT/EP/2017/052137, dated Mar. 27, 2017.
Polymer Blend definiton, Wikipedia, https://de.wikipedia.org/wiki/Polyblend.
Block copolymer definition, Chemgapedia, http://www.chemgapedia.de/vsengine/glossary/de/blockcopolymer.g . . . , Jun. 7, 2018.
Opposition against European Patent No. EP3359469, Patent Proprietors: Norbert Kuhl and Martin Wassmer, Opponent: Société des Produits Nestlé S.A., 68 pp., dated Jan. 9, 2020.
Excerpts from G. Bleisch, H.-C. Langowski, J.-P. Majschak, "Lexikon Verpackungstechnik", Behr's Verlag, Hamburg, 2014.
Excerpts from R. Lippmann, G. Dietz, "Verpackungstechnik", VEB Fachbuchverlag, Leipzig, 1985.
Examination Report for Application No. DE 10 2016 201 498.6, dated Nov. 21, 2016.
Examination Report for Application No. DE 10 2016 201 498.6, dated Mar. 19, 2017.
Examination Report for Application No. AU 2016391789, dated Jul. 23, 2019.
Examination Report for Application No. AU 2016391789, dated Dec. 20, 2019.
Examination Report for Application No. AU 2016391789, dated Apr. 8, 2020.
Examination Report for Application No. AU 2016391789, dated May 18, 2020.
Examination Report for Application No. BR 112018015576-4, dated May 5, 2020.
Examination Report for Application No. CA 3,013,236, dated Jul. 22, 2019.
Examination Report for Application No. CN 201680080723.4 , dated Oct. 23, 2019.
Bleisch, Günter, Horst-Christian Langowski, and Jens-Peter Majschak. *Lexikon Verpackungstechnik*. Hamburg: Behr. pp. 46-49,471, 472 (2014). Partial Translation.
Gerhard Dietz and Roland Lippmann, *Wissensspeicher für Technologen: Verpackungstechnik*. Heidelberg: Hüthig. pp. 227, 236, 301 (1985). Partial Translation.
"Blends That Aren't Really" https://www.pslc.ws/macrog/iblend.htm, 2003 Polymer Science Learning Center.
Tony Rogers "Everything You Need to Know About Polylactic Acid" Oct. 7, 2015, Creative Mechanisms Blog.

* cited by examiner

OXYGEN-TIGHT FOOD CONTAINER

CROSS-REFERENCE TO RELATED APPLICATIONS

This is the United States national phase of International Patent Application No. PCT/EP2016/081458, filed on Dec. 16, 2016, which claims the priority benefit of DE 102016201498.6, filed on Feb. 1, 2016, the entire contents of each of which are incorporated by reference herein.

FIELD OF DISCLOSURE

The invention relates to a plastic food container, as well as a food container cover film, and a food packaging unit, which comprises a food container that is closed with a cover film.

The food container according to the invention is provided to receive liquid, pasty, solid, powdery, in particular ground, or free-flowing foods.

BACKGROUND

For example, the food container according to the invention is part of a plastic coffee or tea capsule. In particular, the food container according to the invention is also suitable for receiving milk products or brewed products other than coffee or tea, such as for instant beverages or instant soups.

Plastic food containers are usually not impermeable or gas-tight, and especially not sealed against the ingress of oxygen, which can interact with the food contained in the food container. When a food container is used for oxygen-sensitive foods, it is thus preferably provided with a gas-tight, water-tight, flavor-tight, and food-safe coating and/or barrier layer if one wishes to reduce to a minimum or even prevent losses in quality due to the effects of oxygen on the foods contained within it. Moreover, a barrier layer of this type provides a flavor seal that protects the foods contained in the food container from losing their flavor, even after a longer period of time. For example, but not exclusively, a water vapor barrier is additionally provided when the food container is used as a receiving unit for products to be brewed (brewing products) so that water-soluble substances in the food container or in its cover film are not melted or even dissolved during the brewing process.

A capsule for receiving a brewed product such as coffee, tea, or the like is known from WO 2014/067 507 A2. The capsule is made of a plastic, in particular of PBT or a plastic in the PBT family. Document WO 2014/067 507 A2 proposes a surface coating as a gas barrier layer for achieving oxygen impermeability, and further discloses applying the gas barrier layer in the plasma evaporation method, inter alia, by the use of silicon.

A plasma evaporation method such as this functions with silicon oxides, which are evaporated in a (high) vacuum by means of an electric arc, which is generated electrically by high voltage, wherein the silicon oxide vapor subsequently settles on the objects located in the vacuum chamber, including the coffee capsules. In DE 10 2011 052 149 A1, it is also required that silicon oxides $SiO_x$ be used in this method for the coating of food packaging unit containers, wherein x should represent a number <2, preferably <0.9. As a further coating method for achieving oxygen impermeability, DE 10 2011 052 149 A1 proposed, inter alia, a plasma polymerization in which organosilanes should preferably be used. All of these methods have the disadvantage that they represent a technically complex process, which is additionally very cost-intensive. Furthermore, the expense of achieving a suitable oxygen impermeability, such as to achieve a longer minimum shelf life, is relatively high and is thus usually not economical compared to oxygen-tight packaging bags, in which the coffee capsules can additionally be packed to achieve the required minimum shelf life.

WO 2015/177591 A2 likewise describes a capsule for use in a device for the preparation of beverages with a one-piece, injection-molded base body, which has a wall, a base, and an outwardly projecting collar surrounding an opening. The base body consists of an injection-molded laminate of two layers of PLA, between which a layer of PVOH is disposed. Documents WO 2013/120997 A1, US 2010/0051861 A1, and U.S. Pat. No. 7,048,975 B1 describe further plastic containers that are configured in multiple layers to meet the requirements of this type of container. It is generally known that multiple work steps or process steps, some of which can run more or less time-staggered, are required for the production of multi-layered materials.

DE 689 07 387 T2 improves the gas barrier property of polybutylene terephthalate (PBT) by mixing in an olefin vinyl alcohol copolymer, in particular by mixing in EVOH, to produce a packaging material for food with improved gas impermeability. Neither PBT nor EVOH is contested for use in food packaging.

WO 2015/158838 A1 discloses a deep-drawn or injection-molded portion capsule for the preparation of beverages, wherein the capsule bodies should generally be produced from a deep-drawn plastic film or in a plastic injection molding process from a plastic, natural product, and/or a biodegradable material.

WO 2014/202694 A1 discloses a portion capsule for the preparation of beverages from a beverage/food material that is provided in the hollow space of a casing. The casing can be liquid-tight and/or substantially gas-tight, but it can also be water permeable in some sections, wherein the casing has multiple layers in one preferred embodiment.

GENERAL DESCRIPTION

The problem addressed by the present invention consists in providing a gas-tight, in particular oxygen-impermeable, water-resistant, water vapor-resistant, flavor-tight, and food-safe food container as well as a food cover film for closing said container. In the process, the disadvantages known from the prior art should be overcome during the production of the two packaging components, and in particular additional packaging bags/films should be avoided. In a further embodiment of the food container and the cover film, these should additionally be biodegradable, preferably in accordance with EN 13432 and/or EN 14995. The production of the food container and the food container cover film should be simple and cost-effective, wherein both the food container and the food container cover film should be robust in design.

The food container according to the invention for receiving a liquid, pasty or free-flowing food has a single-component, injection-molded, cup-shaped base body that is formed from a wall, a bottom, and an outwardly projecting collar. The outwardly projecting collar surrounds an opening, which can be closed by the food container cover film according to the invention.

The food container according to the invention is injection-molded from a polymer blend comprising at least two components. One of the two components is a PVOH (polyvinyl alcohol), which is also called PVAL, or a PVOH copolymer. A completely oxygen-tight plastic food container can be provided by injection-molding a thermoplastic polymer blend consisting of a thermoplastic material, which is, of course, selected from plastics admissible for food containers, and a PVOH or PVOH copolymer that is blended with it, which likewise represents a thermoplastic material.

In the further course of the description of the invention, PVOH copolymers with polymers composed of two or more different monomer units should also fall within the scope of the term "PVOH", wherein one of the monomer units is vinyl alcohol.

A polymer blend, which is often also simply just called a polyblend, is understood to be a mixture of two polymers in the solid state without any chemical reaction occurring between the two plastics. In a purely physical mixture such as this, no chemical bonds occur between the macromolecules of the plastics involved. An example of a polymer blend utilized according to the invention is PE/PVOH or PS/PVOH, wherein the slash between the two plastic types indicates that this is a polyblend or polymer blend. Another exemplary polymer blend that is used represents PE/EVOH, wherein EVOH is an ethylene/vinyl alcohol copolymer. Within the meaning of the invention, EVOH is a specific exemplary embodiment of the second component of a polymer blend used according to the invention. Thus, EVOH falls under the term "PVOH" within the meaning of the invention. However, in addition to the two previously mentioned non-PVOH plastics, PE and PS, it is also possible to use polypropylenes (PP) or polyamides (PA), for example, as well as other admissible thermoplastic materials in the injection-molded polymer blend according to the invention to produce food containers.

If the weight proportion of PVOH or PVAL is greater than 15%, then an increase in oxygen impermeability can be determined, which increases as the weight proportion rises. With the increase in oxygen impermeability, a longer minimum shelf life is achieved, which goes hand in hand with maintaining the quality of the food contained in the food container over a longer period of time. As the weight proportion of PVOH rises, the oxygen impermeability can be further increased, wherein, depending upon the use of the non-PVOH component, a certain saturation proportion with regard to the increase in oxygen impermeability is achieved at ca. 70% weight. Owing to the use of a polymer blend, the physical properties of the food container according to the invention can be influenced and/or controlled more effectively than in a thermoplastic plastic containing only one material as the starting substance for the injection molding. Although using PVOH in its unmixed state would also result in an oxygen-tight food container, its mechanical properties, such as material hardness, would not be sufficient in many applications. It is possible to compensate for and/or adjust this by admixing a suitable further thermoplastic material.

As already has been stated above, any food-safe plastic, i.e. thermoplastic and injection-moldable plastic that is admissible for food, can be used as a non-PVOH or non-PVOH copolymer component in addition to the PVOH or PVOH copolymer components, wherein the further component of the polymer blend according to the invention is a biopolymer in one embodiment of the invention. Within the meaning of the invention, a biopolymer should be understood as a polymer that is biodegradable but not necessarily produced from renewable resources. According to the invention, however, native polymers, such as cellulose, starch, lactic acid, or other polymers that are based on renewable resources, are also used as a component for the polymer blend according to the invention. Moreover, according to the invention, bio-based polymers are used, which are produced, for instance, from organic compounds like starch, sucrose, or glucose. The bio-based polymers additionally include lignin-based thermoplastics as well as epoxy acrylates based on oils, such as linseed or palm oil. These biopolymers are also covered by the inventive concept.

As long as petroleum-based polymers are biodegradable, they are included in the term biopolymer within the meaning of the invention, even if they are not biogenic, i.e. if they were not produced from renewable resources. Certain polyesters can be cited as examples of degradable, petroleum-based polymers, but the polyvinyl alcohol that was used for the second component of the polymer blend as well as polybutylene adipate terephthalate (PBAT), polybutylene succinate (PBS), polycaprolactone (PCL), or polyglycolide (PGA) also represent non-biogenic plastics, yet they are biopolymers within the meaning of the invention, since they are biodegradable. These plastics that are considered biopolymers, i.e. biodegradable polymers, in the invention also include, for example, thermoplastic materials produced from polyhydroxyalkanoates, polyhydroybutyrates, polycaprolactone, polyester, starch, Ingeo™, lignin, natural resins, natural waxes, natural oils, natural fatty acids, cellulose, proteins, or glucose. The above list of biopolymers that can be employed according to the invention cannot be considered exhaustive, however.

In the injection-molding of the food container according to the invention, the use of biopolymers and PVOH in a polymer blend, i.e. in a biopolymer blend, likewise leads to an oxygen-tight, biodegradable food container and thus also contributes to reducing the size of garbage piles in addition to prolonging the minimum shelf-life. The biopolymers used in the polymer blend according to the invention are preferably biodegradable in accordance with EN 13432 and/or EN 14995, i.e. their biological degradation can occur in industrial composting plants. This offers the advantage that the degradation can take place under the conditions of an industrial composting plant; in other words, the biological degradation occurs at a high temperature, at increased humidity, and with a defined oxygen content within a few weeks.

Also according to the invention, in order to close the food container according to the invention, a food cover film is used to close the opening in the plastic food container. The food cover film can be applied, for example, by sealing, bonding, or adhering on the side of the collar of the food container that faces the opening in the cup-like food container. According to the invention, the food container cover film can be configured in one or multiple layers for this purpose. A single-layer cover film according to a first embodiment is produced from a polymer blend, similar to the cup-like food container, one component of which is PVOH or a PVOH copolymer. Normally, this type of cover film according to the invention is produced from a PVOH polymer blend in an extruder process, possibly with subsequent stretching, wherein every other type of film production is likewise encompassed by the inventive concept. Improved oxygen impermeability for food container cover films, which are otherwise not completely oxygen-tight, can be achieved with this embodiment. In this embodiment of the cover film according to the invention, both biopolymers and non-biopolymers can, of course, be used as the second component for a polymer blend used according to the invention. The above statements about biopolymers with reference to the food container according to the invention thus also similarly apply to this embodiment of the cover film according to the invention.

In a further embodiment of the cover film according to the invention, the PVOH used to achieve oxygen impermeability is applied to a carrier layer as a coating. In doing so, the food cover film according to the invention has at least two layers in this embodiment of the invention, wherein a first layer is formed from a cellulose-containing material, and the second layer represents a PVOH layer. Oxygen impermeability is achieved in the cover film in this case, too, by the use of a food cover film according to the invention with a PVOH layer. A food packaging unit according to the invention, which includes an oxygen-tight food container according to the invention that is closed with an oxygen-tight cover film according to one of the two embodiments of the invention, is therefore oxygen-tight as a whole. Additional packaging bags for oxygen-tight packaging, which are often used in the prior art, are thus no longer necessary.

However, it is also possible to achieve oxygen impermeability by applying a PVOH layer to a food cover film when its carrier layer is formed from aluminum or from a plastic layer that is not oxygen-tight. If an aluminum foil or a plastic film containing plastic that is not biodegradable is used, then only the base body of the food container can be biodegraded, if it was produced from a biopolymer blend. As is currently often the case with waste separation, the end user must then dispose of the cover film and the food container separately from each other. When a food cover film according to the invention with a cellulose-containing layer and a PVOH layer is used, the entire food packaging unit that is formed in this way can be discarded in the organic waste.

Specifically when a food packaging unit according to the invention is used with a food container that is injection-molded from a biopolymer blend and that is closed with one of the two food container cover films according to the invention, which contain a bio-plastic in addition to PVOH, the food packaging unit, especially when it is used as a food packaging unit for brewing products, can be discarded as organic waste along with the food contained therein after the brewing process. The food packaging unit produced in this way is thus oxygen-tight due to the use according to the invention of PVOH, as a result of which the minimum shelf life for the food contained therein is significantly increased compared to food packaging units that are not oxygen-tight.

The food container cover film used according to the invention, with a PVOH layer as an oxygen barrier, preferably utilizes a paper, a parchment paper, or an imitation parchment paper as the cellulose-containing layer, wherein the parchment paper already forms a wet-strength layer. When paper is used, a water-resistant—and for brewing product capsules, preferably water vapor-resistant—additional third layer should be provided for the food container cover film according to the invention so that, where appropriate, it is possible to avoid a softening or dissolution of the paper or PVOH layer upon contact with moisture from the food itself or as a result of the manner of storage or use of the food container, e.g. as a soup tureen or the like. This third layer can be produced from a likewise biodegradable plastic, which can be applied to the food cover film by lamination, spraying, or the like, for example. However, biodegradable lacquers or waxes that are approved for foods according to food regulations and/or that can be authorized for this purpose can also be utilized, according to the invention, to create a third layer of the food cover film. If non-biodegradable plastics are used to achieve water resistance and/or a water vapor barrier, then, as was previously explained, the cover foil must be discarded separately from the food container, if this was produced from a biopolymer blend. If the food container itself was not produced from the biodegradable plastic, then a non-biodegradable food container cover film can also be discarded together with the non-biodegradable base body in the residual waste.

When a food container cover film according to the invention that is produced from a PVOH-containing polymer blend is used, it may also be necessary to apply a further layer in order to achieve better water resistance and/or to achieve better water vapor resistance. Similar to the third or fourth layer of the other embodiment of the cover film according to the invention, a second layer in this case can then be formed from a plastic, a lacquer, or a wax that is approved for food packaging. To protect the PVOH in the polymer blend from degrading, this kind of plastic, lacquer, or wax layer can also be applied on both sides of the layer of PVOH polymer blend, for example, when the food packaging unit according to the invention is intended to be used as a container for hot beverages. To prevent repetitions, the statement regarding the biodegradability of the food container and regarding the first embodiment also similarly apply to the second embodiment.

Preferably, the oxygen-tight food container according to the invention is injection-molded from a biopolymer plastic blend and, once the food container is filled with food, is closed with a food container cover film that is likewise biodegradable. Customarily in the prior art, the food cover film can be attached to the collar of the food container by sealing, adhering, or bonding, wherein other methods known from the prior art are also encompassed by the inventive concept.

In order to achieve the oxygen impermeability according to the invention, the food container cover film according to the invention has the aforementioned PVOH-containing layer, which, in one embodiment of the invention, is applied to the e.g. cellulose-containing layer or to an aluminum foil or to another plastic layer by spraying, laminating, adhering, or ironing. In the other embodiment, the PVOH-containing layer is made of a polymer blend that contains PVOH in one component. When a cellulose-containing layer is used, which consists in particular of paper, parchment paper, or imitation parchment paper, either the side of the cellulose-containing layer facing the PVOH layer or the side facing away from the PVOH layer can be printed, for instance with a logo, information about ingredients and/or the minimum shelf life and/or date of manufacture.

Preferably, the cellulose-containing layer is printed before the food container cover film is attached to the food container according to the invention, wherein both the printing and the cellulose-containing layer can be protected with a further plastic layer or a wax or a lacquer so as to create a water vapor barrier. However, the layer for creating a water vapor barrier can also be applied to the PVOH layer, wherein the printed side is then aligned with the PVOH layer in an appropriate manner. The food container cover film according to the invention has three layers in an embodiment that is provided, for example, in cases where dry foods are to be accommodated in the food container. Thus, when the food container is closed, the cellulose-containing layer can be facing the food and the layer that forms the water vapor barrier can be turned outward, and vice versa. The PVOH layer is then disposed between the two layers. In particular biodegradable plastics that are biodegradable in accordance with EN 13432 and/or EN 14995 can be employed to protect the two layers of the food container cover film according to the invention. To prevent repetitions, reference is made to the statements above regarding the biomaterial. The same applies to the second type of cover film according to the invention, wherein here the two layers of PVOH and cellulose are formed by a single layer consisting of a PVOH polymer blend or a PVOH copolymer-polymer blend.

The food packaging unit according to the invention from a food container, which is injection-molded from a polymer blend that has a PVOH as a component, is thus completely oxygen-tight when a food cover film with a PVOH-containing layer is used, and is therefore well-suited for the storage of oxygen-sensitive foods. When the food packaging unit according to the invention is employed as coffee capsules or tea capsules for use in coffee makers or espresso machines that produce a corresponding brewed product with said coffee capsules, a seal can be attached on the side of the collar facing away from the opening in order to seal off the brewing product capsule from the machine receptacle. To this end, the seal material is preferably less hard than the polymer material that is used. The use of a seal is not always necessary, depending upon the biopolymer blend that is used, and is required only if the material hardness of the polymer blend/biopolymer blend in question does not allow the capsule collar to be sealed off from the receptacle of the brewing product machine. Naturally, when a biopolymer blend is used to produce the food container, a seal material should also be used that is itself biodegradable, particularly in accordance with EN 13432 or EN 14995.

Hereafter, preferred exemplary embodiments of the food container according to the invention and the food container cover film according to the invention as well as the food container packaging unit will be explained in detail on the basis of figures, wherein neither the figures nor the description restricts the inventive concept to these embodiments.

BRIEF DESCRIPTION OF THE DRAWINGS

The following is shown.

DETAILED DESCRIPTION

Figures 1, 2, 3, 4:
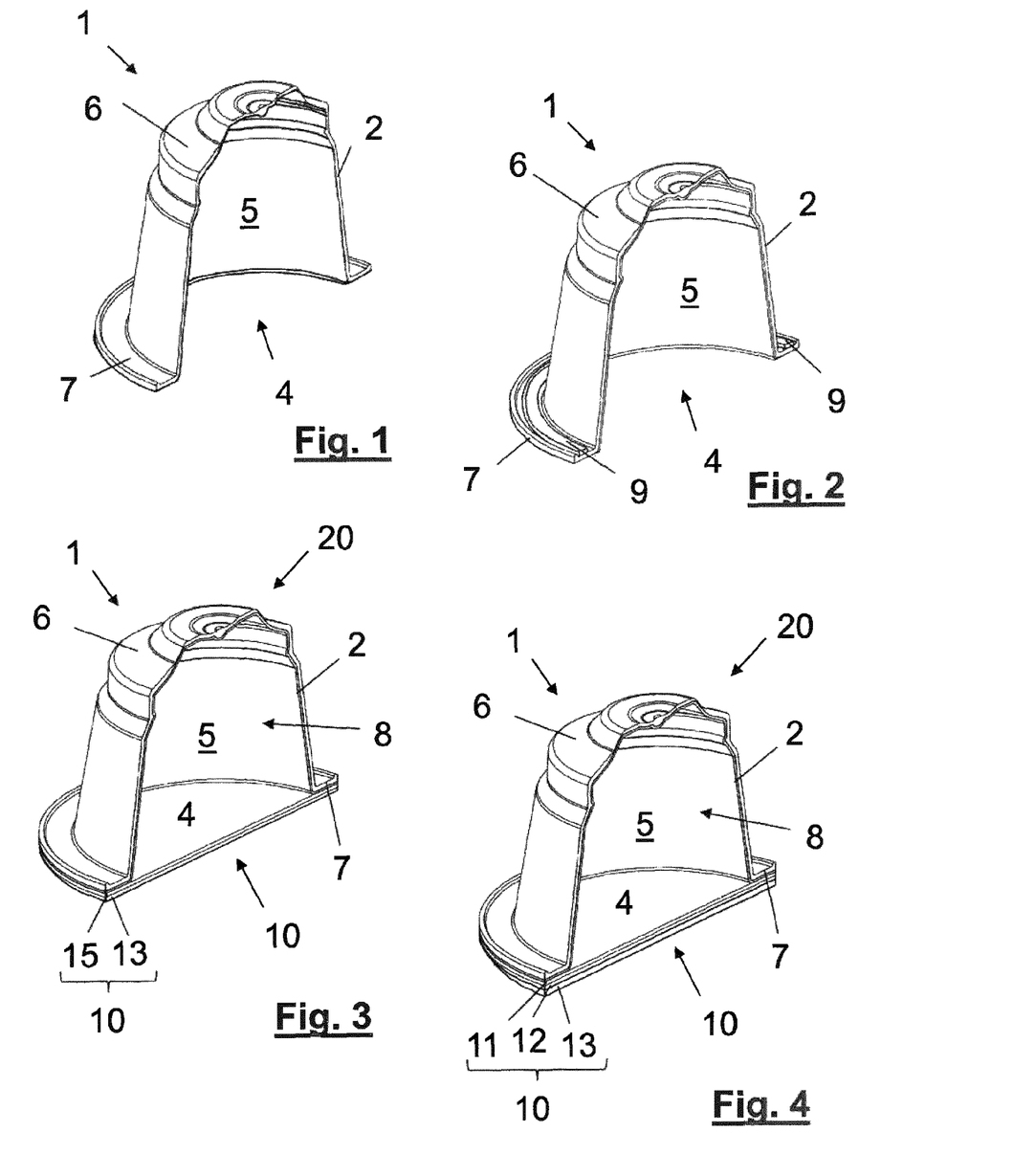
FIG. 1 a perspective sectional view of a food container according to the invention.
FIG. 2 a perspective sectional view of a food container according to the invention with a seal.
FIG. 3 a perspective sectional view of a food container according to the invention that is closed with a first embodiment of the food container cover film according to the invention.
FIG. 4 a perspective sectional view of a food container according to the invention that is closed with a second embodiment of the food container cover film according to the invention.

FIG. 1 shows an exemplary embodiment of the food container 1 according to the invention as a perspective sectional view of a coffee capsule. The food container 1 according to the invention in this case is formed from a cup-like base-body 2, which has a wall 5, a bottom 6, and a collar 7. The wall 5 surrounds an opening 4, which is surrounded by a collar 7 that projects outwardly over the wall 5. The cup-like food container can be filled with the food via the opening 4.

As has already been explained above, it may be necessary for some uses of the food container 1 according to the invention to attach a seal 9 on the side of the collar 7 facing away from the opening 4 to seal off the food container 1 when used, for example, as a coffee capsule or tea capsule in corresponding preparation machines, from the machine receptacle. An embodiment such as this is shown in FIG. 2.

FIG. 3 shows a food container 1 that is closed by a cover film 10, wherein the food container cover film 10 according to the invention is produced from a PVOH polymer blend 15. This can be made from a polymer blend of a PE and EVOH copolymer, for example, and can be applied to the collar 7 of the food container by ironing, fusing, or adhering. In this embodiment, the food packaging unit 20 for foods contained therein is oxygen-tight and, at least for a short time, water- and/or water vapor-resistant. If the water and/or water vapor resistance is not sufficient for the intended use of the food packaging unit, then layers 13 and 14 of plastic, lacquer, or wax, which ensure the necessary water and/or water vapor resistance of the cover film 10, can be applied to one or both sides of the PVOH polymer blend layer 15.

FIG. 4 shows a second exemplary embodiment of a food container according to the invention in a perspective sectional view, wherein said container is closed with a food container cover film 10 according to the invention, which is applied to the collar 7. The second embodiment of the food container cover film 10 shown in FIG. 4 is depicted in a three-layer embodiment, wherein a first layer is e.g. a cellulose-containing layer, a second layer 12 is e.g. a PVOH layer, and the third layer 13 is a plastic layer that forms a water vapor barrier for the two aforementioned layers. The third layer 13 in this instance can be formed from a plastic material, a wax, or a lacquer that is admissible for food containers. For purposes of presentation, all three layers are shown with exaggerated thickness in FIG. 3 so that it is possible to visually differentiate among the individual layers. In practice, though, all three layers of the food cover film 10 according to the invention together fall, for example, within a thickness range for conventional food films. Here, a layer thickness in the range of tenths of millimeters or nanometers is usual, in particular for the third layer 13, which functions as a water vapor barrier. The cellulose-containing layer that forms the first layer 11 is normally also settled in the range of tenths of a millimeter. The same applies for the PVOH layer 11, wherein the material of the further, cellulose-containing layer 11 and its layer thickness should be taken into account in order to achieve the desired oxygen impermeability in a food cover film 10 according to the invention. In the presence of a third layer 13 or even a fourth layer 14 to create a water vapor barrier, the layer thickness for establishing a required oxygen impermeability can vary and/or can be adapted to the type of film and/or to the number of layers. Which film is employed depends in this case upon the intended use of the food packaging unit.

The food container cover film 10 according to the invention closes the food container 1, as is shown in FIGS. 3 and 4, and so a receiving volume 8 that is suitable for food is formed. It was already disclosed in the general section that the plastics of the polymer blend for this purpose used for the injection-molding of the food container 1 should be food-safe, i.e. they should be approved for foods or the appropriate approval can be sought. In order to achieve oxygen impermeability, a component of the injection-molded polymer blend PVOH and a layer of the food container cover film 10 is a PVOH-containing layer, in this case the second layer 12 or layer 15, a possible exemplary embodiment.

If the food container 1 and/or the food container 1 that is closed with a cover film 10 and then forms a packaging unit 20 is intended for use as a coffee capsule and to receive powdery or ground coffee, and if this coffee capsule is stored only in dry conditions, then it is possible to consider completely omitting the layers 13 and 14 that function as the water vapor barrier. If the water vapor barrier is not used and if, at the same time, the cellulose-containing layer is made of a paper or an imitation parchment paper that is not wet-strength, then the PVOH layer should be arranged on the inner side. With the PVOH layer on the inside facing the base body 2 of the food container 1, the cover film 10 can be bonded, adhered, or sealed, for example, to the collar of the food container 1 in a simple way. Naturally, this also applies to a reverse or other arrangement of the layers of the cover film 10.

Figure 5:
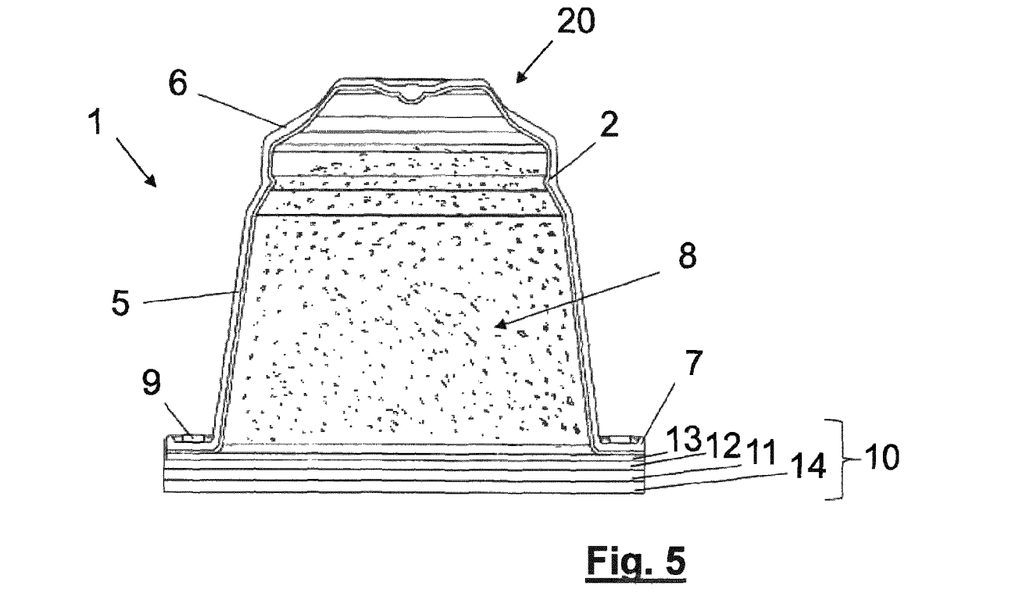
FIG. 5 a food packaging unit according to the invention with a free-flowing food contained within it.

A food packaging unit 20 filled with coffee is shown in FIG. 5, wherein the cover film 10 that closes the food container 1 is constructed of four layers. The third layer 13, which is configured as a water vapor barrier, is facing the collar 7 of the base body 2 of the food container 1; the second PVOH layer 12 forms the second-innermost layer; and the layer 11 produced from a cellulose-containing material forms a third layer, which can have outwardly facing printing, for example. To provide the final water resistance, especially water vapor resistance, a fourth layer 14 consisting e.g. of a plastic, a wax, or a lacquer can be applied, which protects the cellulose layer and/or the PVOH-containing layer against moisture damage. With a three- or four-layer cover film 10 such as this, the food packaging unit according to the invention is not only oxygen-tight but also water- and/or water vapor-resistant. This represents an example of a use of the food packaging unit according to the invention as a coffee brewing capsule. Other commonly used applications in the art are included in the inventive concept, of course.

Figure 6:
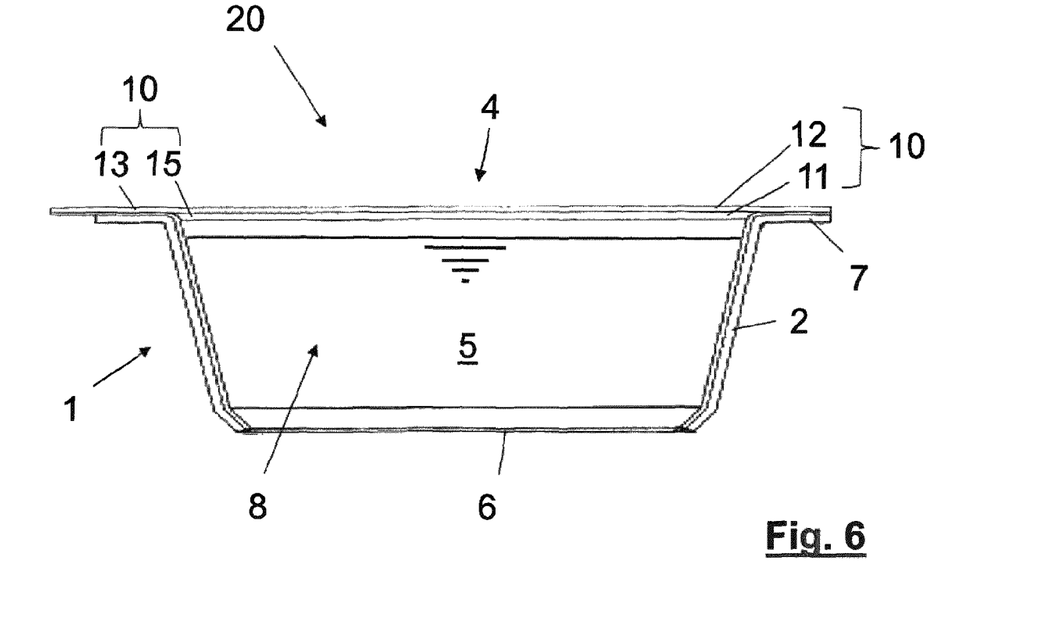
FIG. 6 a food packaging unit according to the invention with a pasty food contained within it.

FIG. 6 shows an example of the food packaging unit 20 according to the invention as a yoghurt cup or as a coffee creamer container, and a pasty or liquid food product is contained within its receiving volume 8. The cup-like base body 2 in this instance is closed over the collar 7 with a two-layer cover film 10, wherein the PVOH-containing layer 12 faces the collar 7. In this way, the liquid and/or pasty food product is prevented from coming into contact with the cellulose-containing layer 11 of the cover film 10. The cellulose-containing layer 11 can have both decorative and informative printing in order to give the food container according to the invention and/or the food packaging unit according to the invention a graceful appearance. In the second embodiment according to the invention, the polymer blend layer 15 could be arranged such that it faces the collar 7, for example, to protect it from outside against the adverse effects of moisture by means of a water or water vapor barrier layer 13. The same can occur for the two embodiments through an internally disposed water or water vapor barrier layer 14 (not shown), as well, if necessary, such as when the food contained in the food container 1 interacts with the PVOH-containing layer 12 or 15 and this is undesirable.

In an exemplary embodiment, the cup-like base body 2 is produced from a polymer blend, one component of which is PVOH for achieving oxygen impermeability and the other component represents a biopolymer plastic. In an embodiment such as this, the food packaging units 20 according to the invention as shown in FIGS. 3 to 5 are completely biodegradable, i.e. the food packaging unit 20 can be discarded in the organic waste after the food contained therein has been removed or used.

Overall, the food container 1 according to the invention, which can be closed by the cover film 10 according to the invention, provides a food packaging unit 20 according to the invention, which is oxygen-tight as a result of the use of PVOH as an addition to an injection-molded polymer blend and the use of PVOH in or on a cover film. With these embodiments according to the invention, the complicated coating methods, especially for achieving oxygen impermeability in the food container 1, that are known from the prior art can largely be avoided. The food packaging unit 20 according to the invention thus permits the simple and cost-effective production of a packaging unit 20 for food, which is also biodegradable when biopolymers are used as additional participating materials, by the simple use of PVOH as an addition to the injection molding plastic or as a film material and as a coating of a cover film constructed in one, two, three, or four layers. Preferably, the entire food packaging unit is biodegradable in an industrial composting plant in accordance with EN 13432 and/or EN 14995.

The invention claimed is:

1. A food-safe container for receiving a liquid, pasty or free-flowing food, comprising:
   a single-piece, injection-molded, cup-shaped base body with a wall, a bottom, and an outwardly projecting collar all formed by injection molding, which surrounds an opening,
   wherein the injection-molded food-safe container is formed of a single layer of a thermoplastic polymer blend with no additional layers, and a side of the collar facing away from the opening has a seal, which has a lower material hardness than the thermoplastic polymer blend,
   wherein the thermoplastic polymer blend comprises two plastics, of which the first plastic is a thermoplastic polyvinyl alcohol homopolymer and the second plastic is a food-safe, biodegradable, thermoplastic bioplastic,
   wherein the food-safe, biodegradable, thermoplastic bioplastic is a compostable plastic in accordance with EN 13432 and/or EN 14995 selected from the group consisting of thermoplastic material produced from glucose, thermoplastic material produced from cellulose, and thermoplastic material produced from lignin, and not including polylactic acid (PLA) or polybutylene succinate (PBS),
   wherein the weight proportion of the thermoplastic polyvinyl alcohol in the thermoplastic polymer blend is between 15% by weight and 70% by weight, and
   wherein the food-safe container is oxygen-tight.

2. The food-safe container according to claim 1, in which the material of the seal is biodegradable in accordance with EN 13432 and/or EN 14995.

3. An oxygen-tight food packaging unit comprising the food-safe container according to claim 1, further comprising a food-safe container cover film, which is applied to the food-safe container by sealing, bonding, or adhering in order to close an opening, wherein the food-safe container cover film is produced in a single layer from the thermoplastic polymer blend.

4. The oxygen-tight food packaging unit according to claim 3, in which the food-safe container cover film is coated on one or both sides with a layer consisting of a plastic, wax, or lacquer that is suitable for food packaging, wherein the layer applied to at least one side provides a water vapor barrier.

5. The oxygen-tight food packaging unit according to claim 3, in which the food-safe container cover film additionally has a cellulose-containing layer consisting of a paper, a parchment paper, or an imitation parchment paper.

6. The oxygen-tight food packaging unit according to claim 5, in which the single-layer food-safe container cover film is applied to the cellulose-containing layer by lamination, adhering, or ironing.

7. The oxygen-tight food packaging unit according to claim 5, in which the side of the cellulose-containing layer facing the food-safe container cover film and/or facing away from the food-safe container cover film is printed.

8. An oxygen-tight food packaging unit with a food-safe container according to claim 1, in which the opening in the base body is closed by a food-safe container cover film applied to the collar wherein the cover film comprises a bio-plastic and polyvinyl alcohol.

9. An oxygen-tight food packaging unit with a food-safe container according to claim 1, in which the opening in the base body is closed by a food-safe container cover film, which is applied to the collar, wherein a layer of the food-safe container cover film is formed from an aluminum foil or a non-biodegradable plastic film.

10. The oxygen-tight food packaging unit according to claim 8, in which the food-safe container cover film is connected to the collar of the base body by sealing, adhering, or bonding.

11. The oxygen-tight food packaging unit according to claim 9, in which the food-safe container cover film is connected to the collar of the base body by sealing, adhering, or bonding.

12. The food-safe container according to claim 1, wherein the food-safe container is used as a brewing capsule in liquid brewing product machines.

13. A food-safe container for receiving a liquid, pasty or free-flowing food, comprising:
a single-piece, injection-molded, cup-shaped base body with a wall, a bottom, and an outwardly projecting collar all formed by injection molding, which surrounds an opening,
wherein the injection-molded food-safe container is formed of a single layer of a thermoplastic polymer blend with no additional layers,
wherein the thermoplastic polymer blend comprises two plastics, of which the first plastic is a thermoplastic polyvinyl alcohol homopolymer and the second plastic is a food-safe, biodegradable, thermoplastic bioplastic,
wherein the food-safe, biodegradable, thermoplastic bio-plastic is a compostable plastic in accordance with EN 13432 and/or EN 14995 selected from the group consisting of thermoplastic material produced from glucose, thermoplastic material produced from cellulose, and thermoplastic material produced from lignin, and not including polylactic acid (PLA) or polybutylene succinate (PBS),
wherein the weight proportion of the thermoplastic polyvinyl alcohol in the thermoplastic polymer blend is between 15% by weight and 70% by weight, and
wherein the food-safe container is oxygen-tight and water-resistant, and the food-safe container is used as a brewing capsule in liquid brewing product machines.

14. An oxygen-tight food packaging unit comprising the food-safe container according to claim 13, further comprising a food-safe container cover film, which can be applied to the food-safe container by sealing, bonding, or adhering in order to close an opening, wherein the food-safe container cover film is produced in a single layer from the thermoplastic polymer blend.

15. The oxygen-tight food packaging unit according to claim 14, in which the food-safe container cover film additionally has a cellulose-containing layer consisting of a paper, a parchment paper, or an imitation parchment paper applied to the single-layer food-safe container cover film by lamination, adhering, or ironing.

16. The oxygen-tight food packaging unit according to claim 15, in which the side of the cellulose-containing layer facing the food-safe container cover film and/or facing away from the food-safe container cover film is printed.

17. An oxygen-tight food packaging unit comprising the food-safe container according to claim 13, in which the opening in the base body is closed by a food-safe container cover film applied to the collar wherein the cover film comprises a bio-plastic and polyvinyl alcohol.

18. An oxygen-tight food packaging unit comprising the food-safe container according to claim 13, in which the opening in the base body is closed by a food-safe container cover film, which is applied to the collar, wherein a layer of the food-safe container cover film is formed from an aluminum foil or a non-biodegradable plastic film.

19. The oxygen-tight food packaging unit according to claim 17, in which the food-safe container cover film is connected to the collar of the base body by sealing, adhering, or bonding.

20. The oxygen-tight food packaging unit according to claim 18, in which the food-safe container cover film is connected to the collar of the base body by sealing, adhering, or bonding.

21. The food-safe container according to claim 13, in which the side of the collar facing away from the opening has a seal, which has a lower material hardness than the thermoplastic polymer blend.

* * * * *